(12) United States Patent
Smith et al.

(10) Patent No.: US 7,311,185 B2
(45) Date of Patent: Dec. 25, 2007

(54) METHOD FOR THERMAL MANAGEMENT FOR A CONTROLLABLE VISCOUS FAN DRIVE

(75) Inventors: Anthony L. Smith, Troy, MI (US); Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 219 days.

(21) Appl. No.: 11/227,310

(22) Filed: Sep. 15, 2005

(65) Prior Publication Data

US 2006/0060443 A1    Mar. 23, 2006

Related U.S. Application Data

(60) Provisional application No. 60/612,404, filed on Sep. 23, 2004.

(51) Int. Cl.
*F16D 35/00*    (2006.01)
*F16D 37/02*    (2006.01)
*F16D 43/25*    (2006.01)

(52) U.S. Cl. ............... 192/21.5; 123/41.12; 192/58.67; 192/82 T; 192/113.21

(58) Field of Classification Search ............ 192/58.43, 192/58.63, 58.64, 58.67, 58.68
See application file for complete search history.

(56) References Cited

U.S. PATENT DOCUMENTS

| | | | | | |
|---|---|---|---|---|---|
| 4,573,559 | A | * | 3/1986 | Shepherd | 192/58.62 |
| 5,584,371 | A | * | 12/1996 | Kelledes et al. | 192/58.61 |
| 5,823,912 | A | * | 10/1998 | Fischer et al. | 192/82 T |
| 5,896,964 | A | * | 4/1999 | Johnston et al. | 192/21.5 |
| 6,648,115 | B2 | | 11/2003 | Smith et al. | 192/21.5 |
| 7,011,198 | B2 | * | 3/2006 | Buchholz et al. | 192/58.61 |
| 2005/0177294 | A1 | * | 8/2005 | Jiang et al. | 701/67 |

* cited by examiner

*Primary Examiner*—Rodney H. Bonck

(57) ABSTRACT

The present invention provides a method of controlling thermal energy within a fan drive. The fan drive includes an input member rotating at an input speed, and an output member attached to the fan and rotating at a fan speed, with a viscous fluid disposed therebetween. The fluid selectively transmits torque between the input member and the output member such that the fan speed is a function of a controllable parameter of the fluid. The parameter is continually controlled by a programmed controller. The method includes the steps of pre-determining a threshold temperature for the fan drive, with the threshold temperature approaching a maximum desirable temperature for the fan drive, and adjusting the fan speed as necessary to maintain a fan drive temperature below the threshold temperature. The controller may regulate fluid volume or fluid viscosity, or any other controllable parameter of the fluid.

15 Claims, 2 Drawing Sheets

METHOD FOR THERMAL MANAGEMENT FOR A CONTROLLABLE VISCOUS FAN DRIVE

CROSS-REFERENCE TO RELATED APPLICATION

This application claims the benefit of U.S. Provisional Application 60/612,404 filed Sep. 23, 2004, which is hereby incorporated by reference in its entirety.

TECHNICAL FIELD

The present invention pertains to the control of viscous fan drives such as those used in automotive cooling systems. More particularly, this invention relates to the control of viscous fan drives to regulate fan speed in order to manage thermal energy therein.

BACKGROUND OF THE INVENTION

Motor vehicles with internal combustion engines conventionally employ a fan to move cooling air through one or more heat exchangers to reduce the temperature of fluids such as engine coolant, engine oil, automatic transmission fluid and air conditioner refrigerant. Fan speed is typically controlled by a fan drive having a clutch with a driven input member rotating at an input speed and an output member attached to the fan rotating at the fan speed. Fan drives that operate to provide variable or controllable fan speeds are known in the art. Typically, such fan drives vary the amount or the viscous properties of a contained fluid to vary the angular fan speed by transferring torque between the input member and the output member. For example, in a magnetorheological (MR) fan drive, an MR fluid is carried in a working chamber within the fan drive. Selective application of a magnetic field controls rotation of the output member relative to the driven input member by varying the effective viscosity of the MR fluid. MR fluids are known in the art, and typically comprise ferromagnetic particles, such as finely powdered iron or iron alloy, dispersed within a carrier fluid, such as mineral oil or silicone. MR fluids transform almost instantaneously into a semi-solid state in the presence of a magnetic field as the ferromagnetic particles assemble into somewhat stiff chains along the magnetic field, thereby increasing the torque transferred between the input member and the output member. When the magnetic field is removed, the chains disperse and the MR fluid re-liquefies, such that the fan drive input and output members are only minimally engaged, permitting relative and significantly independent rotation therebetween. Therefore, varying the strength of the magnetic field provides rapid, variable control over fan speed. However, the slippage in the fan drive clutch does result in slip power generation and loss, which can translate into clutch temperature increase. It is desirable to limit, if possible, the clutch temperature for several reasons, fan drive durability being one of them.

SUMMARY OF THE INVENTION

The present invention provides a method of controlling thermal energy within a fan drive. The fan drive includes an input member rotating at an input speed, and an output member attached to the fan and rotating at a fan speed, with a viscous fluid disposed therebetween. The fluid may be disposed within a working chamber defined between the input member and the output member. The fluid selectively transmits torque between the input member and the output member such that the fan speed is a function of a controllable parameter of the fluid. The parameter is continually controlled by a programmed controller. The fan drive may further include fan drive fins. The method includes the steps of pre-determining a threshold temperature for the fan drive, with the threshold temperature approaching a maximum desirable temperature for the fan drive, and adjusting the fan speed as necessary to maintain a fan drive temperature below the threshold temperature. The controller may regulate fluid volume or fluid viscosity, or any other controllable parameter of the fluid.

In one aspect of the present invention, the adjusting step may include the steps of sensing vehicle parameters, estimating the fan drive temperature based on the vehicle parameters, comparing the fan drive temperature to the threshold temperature; and adjusting the fan speed at either a first rate or a second rate when the fan drive temperature is less than the threshold temperature, and at either a third rate or a fourth rate when the fan drive temperature exceeds the threshold temperature. The absolute value of the first rate is preferably less than the absolute value of the third rate, while the absolute value of the second rate is preferably less than the absolute value of the fourth rate, such that the fan speed increases or decreases more rapidly when the fan drive temperature exceeds the threshold temperature.

In another aspect of the present invention, the adjusting step may include the steps of sensing vehicle parameters, estimating a fan drive temperature and determining a desired fan speed based on the vehicle parameters, comparing the fan drive temperature to the threshold temperature, determining a modified desired fan speed if the fan drive temperature exceeds the threshold temperature, and adjusting the fan speed toward the desired fan speed when the fan drive temperature is less than the threshold temperature, and toward the modified desired fan speed when the fan drive temperature exceeds the threshold temperature.

According to one aspect of the present invention, the fan drive temperature is estimated using the following equation:

$$T_F(k+1) = T_F(k) + K_1 \omega_F^2(k)(\omega_{in}(k) - \omega_F(k)) - K_2(T_F(k) - T_\infty(k)).$$

In this equation, $T_F$ is the fan drive temperature, $\Delta t$ is a sampling period, k is the time step over the sampling period, $$K_1 = \frac{K_F \Delta t}{m c_p},$$

with $K_F$ being a fan torque constant for a given fan design, m is effective mass, and $c_p$ is effective thermal heat capacity, $\omega_F$ is the fan speed, $\omega_{in}$ is the input speed, $$K_2 = \frac{hA\Delta t}{m c_p},$$

with h being the effective convective heat transfer coefficient of the fan drive fins, and A being the area of the fan drive fins, and $T_\infty$ is the ambient air temperature around the fan drive fins.

In another aspect of the present invention, the modified desired fan speed, $\omega_{F,desired,new}$, is determined such that:

$$K_2(T_F(k) - T_\infty(k)) - K_1 \omega_{F,desired\_new}^2(k)(\omega_{in}(k) - \omega_{F,desired,new}(k)) \geq K_3.$$

In this equation, $$K_2 = \frac{hA\Delta t}{mc_p},$$

with h being the effective convective heat transfer coefficient of the fan drive fins, and A being the area of the fan drive fins, $T_F$ is the fan drive temperature, $\Delta t$ is a sampling period, k is the time step over the sampling period, $\Delta t$, $T_\infty$ is the ambient air temperature around the fan drive fins, $$K_1 = \frac{K_F \Delta t}{mc_p},$$

with $K_F$ being a fan torque constant for a given fan design, m is effective mass, and $c_p$ is effective thermal heat capacity, $\omega_{in}$ is the input speed, and $K_3$ is a minimum desired temperature adjustment per time step, k. The fan speed may be adjusted at either the first or second ramping rate toward the desired fan speed, and at either the third or fourth ramping rate toward the modified desired fan speed. In another aspect of the present invention, the method may include the step of determining whether engine coolant temperature is low enough to permit a reduction in fan speed without overheating a vehicle engine before reducing the fan speed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
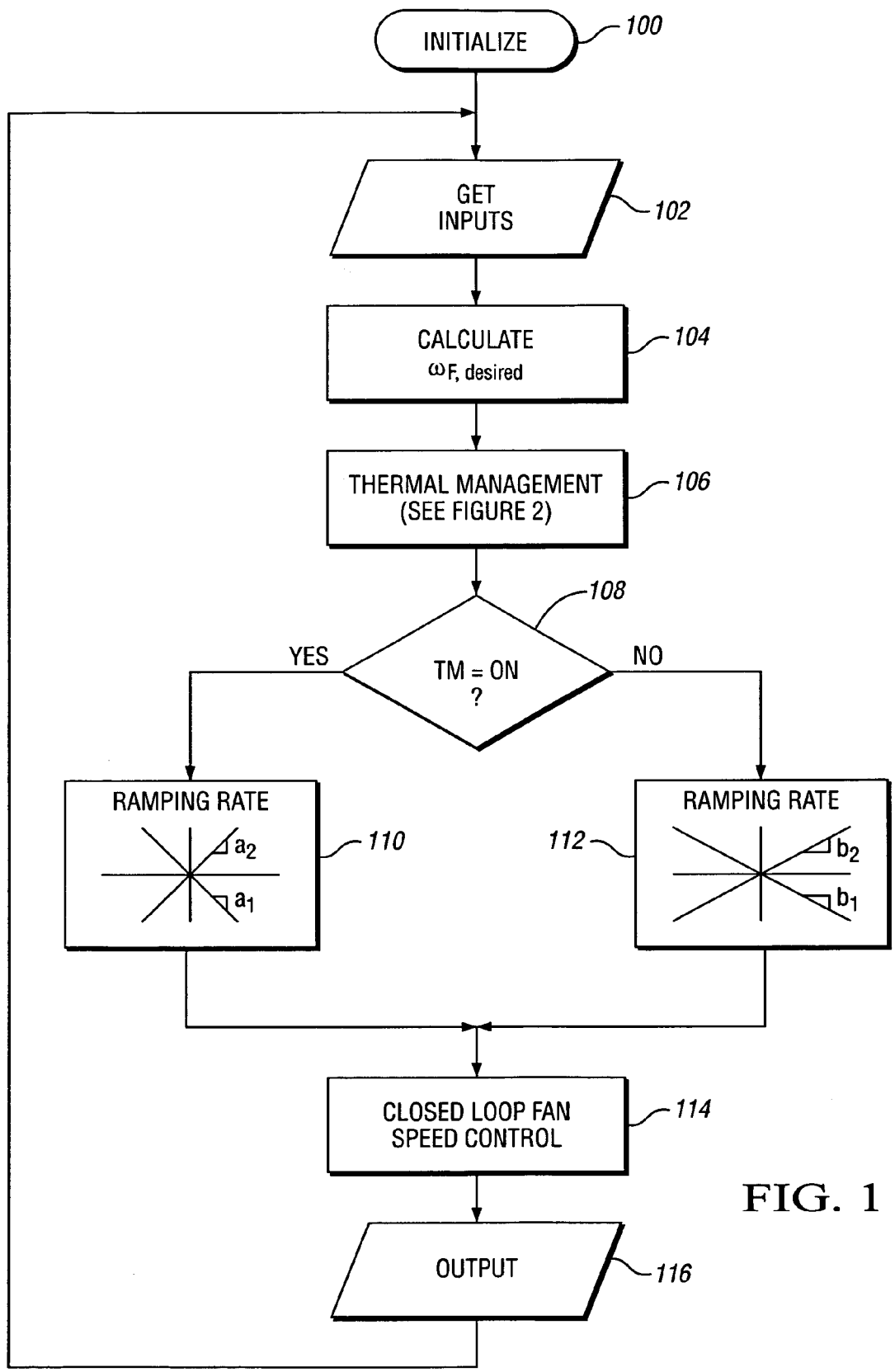
FIG. 1 is a process flow diagram of a fan control algorithm according to the present invention.
Figure 2:
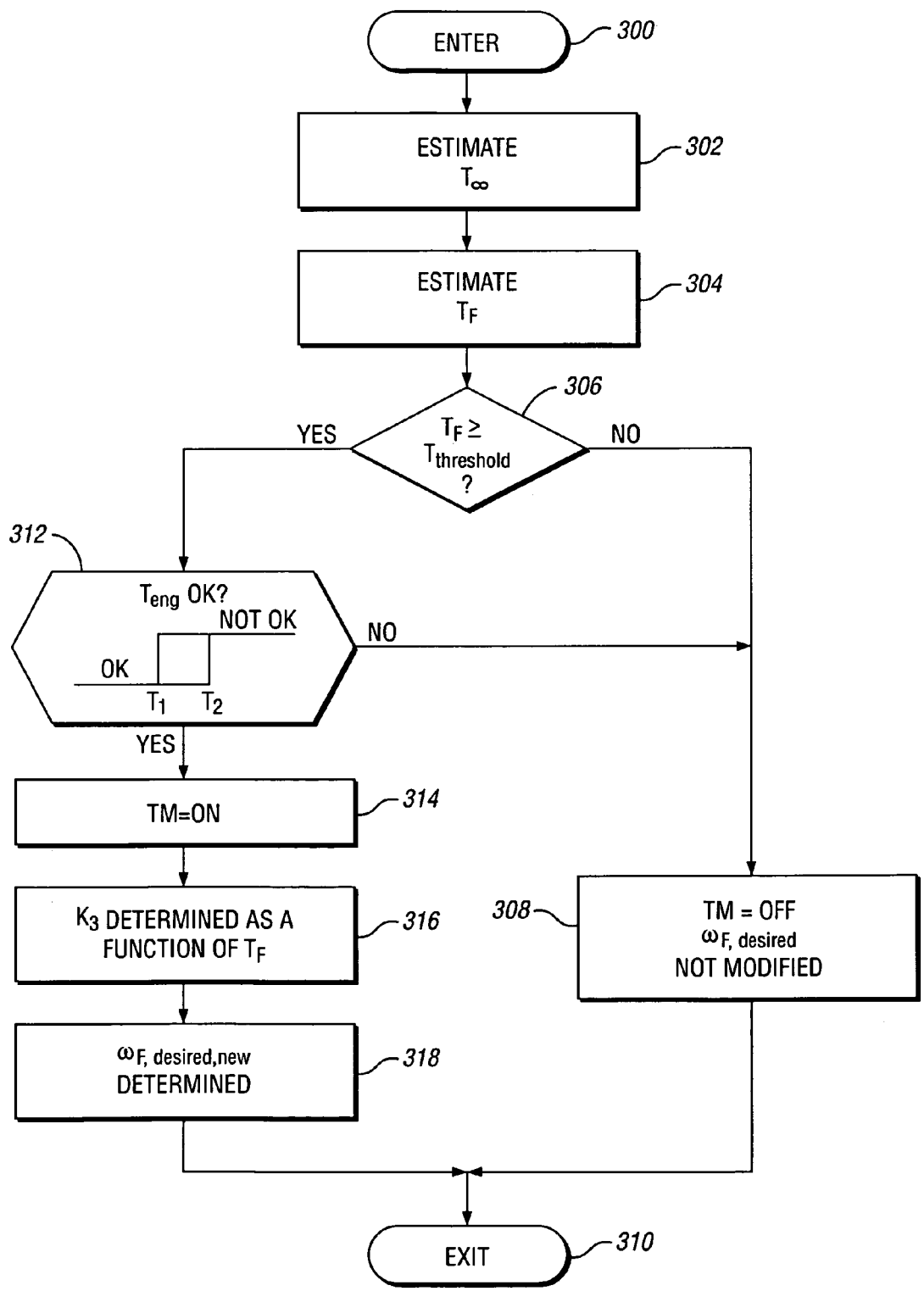
FIG. 2 is a process flow diagram of a thermal management algorithm according to the present invention.

The present invention provides an algorithm for controlling thermal energy, i.e., temperature, within a cooling fan. Cooling fan algorithms are known within the art. A similar algorithm is described in U.S. Pat. No. 6,648,115, which is hereby incorporated by reference in its entirety. FIG. 1 is a process flowchart of a preferred embodiment of an overall cooling fan control algorithm incorporating a thermal management algorithm according to the present invention. FIG. 2 is a process flowchart for implementing a preferred embodiment of the thermal management algorithm into the overall cooling fan algorithm.

Referring first to FIG. 1, block 100 designates a series of initialization instructions executed at the initiation of vehicle operation for appropriately setting the initial condition or state of various terms referred to below. The process then proceeds to input block 102.

At block 102, a vehicle controller reads sensor inputs such as ambient air temperature around the fan drive fins, $T_\infty$, engine coolant temperature, transmission oil temperature, and air conditioner discharge (head) pressure. Typically, an analog/digital channel is used to read voltage on a temperature or pressure sensor. The controller may use a lookup table to convert the voltage to engineering units of temperature or pressure. The controller also calculates current actual fan speed, $\omega_F$, in rpm.

After reading the various sensor inputs at block 102, the process proceeds to block 104. The programmed controller calculates a desired fan speed, $\omega_{F,desired}$, using either a prescribed functional relationship and/or a lookup table which is monotonically increasing and piecewise linear. A desired fan speed, $\omega_{F,desired}$, is calculated for each of the temperature inputs and the pressure input. The lookup table is monotonically increasing because the desired fan speed, $\omega_{F,desired}$, increases or remains constant with increasing temperature or pressure. It is piecewise linear because it is implemented by table lookup and the controller linearly interpolates between calibration values listed in the lookup table. The maximum value of these various desired fan speeds is chosen as the desired fan speed, $\omega_{F,desired}$, and then used as the output of block 104. By way of example, the controller may determine that the desired fan speed, $\omega_{F,desired}$, should be 1600 rpm based on transmission oil temperature, 1800 rpm based on engine coolant temperature, and 1200 rpm based on air conditioner head pressure. The controller would then take the largest of these values, 1800 rpm, and set the desired fan speed, $\omega_{F,desired}$, equal to 1800 rpm. The values presented herein are meant for explanatory purposes only; the desired fan speed, $\omega_{F,desired}$, determined by the controller need not mirror the values to implement the present invention.

The process then undertakes the thermal management portion of the overall fan control process. The step is indicated as block 106 of FIG. 1, but the illustration of thermal management is best understood with reference to FIG. 2. Referring to FIG. 2, block 300 is a conceptual entry block for carrying the desired fan speed, $\omega_{F,desired}$, into the thermal management portion of the control process. In block 302, if the ambient air temperature around the fan drive fins, $T_\infty$, was not explicitly measured by any suitable sensor in block 102, the controller estimates the ambient air temperature around the fan drive fins, $T_\infty$, based on values stored within the controller as known in the art.

In block 304, the controller estimates the fan drive temperature, $T_F$, as described herein. Input power, $P_{in}$, to the fan drive is given by the following equation: $P_{in} = \tau_{in}\omega_{in}$ where $\tau_{in}$, is input torque, the torque of an input member of the fan drive, and $\omega_{in}$ is input speed, the angular speed of the input member of the fan drive. The input speed, $\omega_{in}$, is preferably engine speed or a related speed depending on gear or pulley ratio. The input torque, $\tau_{in}$ is approximately equal to a fan torque, $\tau_F$, since slip ring torque is minimal. Slip speed, $\omega_s$, the difference in speed across the fan drive, is defined as: $\omega_s = \omega_{in} - \omega_F$, where $\omega_F$ is fan speed, which can be detected by a suitable sensor, such as a Hall device sensor. Therefore, the input power, $P_{in}$, can be re-written as: $P_{in} \approx \tau_F(\omega_s + \omega_F)$, and thus: $P_{in} \approx \tau_F \omega_s + \tau_F \omega_F$. Since bearing torque is relatively small, especially under conditions where the slip power is high, slip torque, $\tau_s$, and fan torque, $\tau_F$, are approximately equal. Therefore: $P_{in} \approx \tau_s \omega_s + \tau_F \omega_F$, which leads to: $P_{in} \approx P_s + P_F$, where $P_s$ is slip power and $P_F$ is fan power.

Conservation of energy over some time period can be expressed as: $E_{stored} = E_{in} + E_{out} = C$, where $E_{stored}$ is stored energy at the end of the time period, in this case thermal energy stored within the fan drive, $E_{in}$ is energy into the fan drive over the time period, and $E_{out}$, is the energy out of the fan drive over the time period, and C is a constant which is equal to the stored energy at the beginning of the time period. Ignoring radiative heat loss, and the minimal energy dissipated by the slip ring and fan drive bearings, the conservation of energy equation becomes: $mc_p T_F|_{t_1}^{t_2} = \int_{t_1}^{t_2} P_s dt - \int_{t_1}^{t_2} hA(T_F - T_\infty) dt$, where m is the effective mass of the fan drive storing thermal energy, $c_p$ is the effective thermal heat capacity of the mass, h is the effective convective heat transfer coefficient of fins disposed on the fan drive, A is area of the fins, and $T_\infty$ is the ambient air temperature around the fins. Since the fan speed, $\omega_F$, varies air flow over the fins, h will typically be a function thereof. From this equation, it can be seen that slip power, $P_s$, is the main source of thermal energy input into the fan drive, and that the fan drive fins are the main source of thermal heat dissipation from the fan drive.

The fan torque, $\tau_F$, is approximated as: $\tau_F \approx K_F \omega_F$, where $K_F$ is a fan torque constant determined for a given fan design. Since slip torque, $\tau_s$, and fan torque, $\tau_F$, are approximately equal, slip power, $P_s$ can be calculated as: $P_s \approx K_F \omega_F^2 (\omega_{in} - \omega_F)$. This shows that the slip power, $P_s$, is a function of both input speed, $\omega_{in}$, and fan speed, $\omega_F$. Substituting this equation for slip power, $P_s$, back into the conservation of energy equation and taking the time derivative leads to:

$$mc_p \frac{dT_F}{dt} = K_F \omega_F^2 (\omega_{in} - \omega_F) - hA(T_F - T_\infty). \quad \text{(Equation 1)}$$

The discrete form of this equation leads to the fan drive temperature estimation equation:

$$T_F(k+1) = T_F(k) + K_1 \omega_F^2(k)(\omega_{in}(k) - \omega_F(k)) - K_2(T_F(k) - T_\infty(k)), \quad \text{(Equation 2)}$$

where $$K_1 = \frac{K_F \Delta t}{mc_p}, \quad K_2 = \frac{hA\Delta t}{mc_p},$$

$\Delta t$ is the discrete sampling period, and k is the time step over the sampling period, $\Delta t$.

Turning back to FIG. 2, the controller uses Equation 2 to estimate the fan drive temperature $T_F$ in block 304. In block 306, the controller asks: $T_F \geq T_{threshold}$?, where $T_{threshold}$ is a temperature below $T_{max}$ at which thermal management is deemed necessary. If the controller waits to act until the fan drive temperature, $T_F$, actually reaches the maximum temperature, $T_{max}$, thermal management may not occur quickly enough to protect the fan drive. Instead, thermal management should begin as the fan drive temperature, $T_F$, approaches the maximum temperature, $T_{max}$, to ensure fan drive integrity. Therefore, a threshold temperature, $T_{threshold}$, at which temperature management begins is predetermined and entered into the controller based on the specific fan drive utilized. Preferably, the difference between $T_{max}$ and $T_{threshold}$ should be greater than the maximum uncertainty in the temperature estimation equation, Equation 2.

If block 306 is false (the answer to the query is "no"), then the thermal management algorithm is unnecessary, and the value for $\omega_{F,desired}$ determined in block 104 is acceptable, since the fan drive temperature, $T_F$, is below the maximum acceptable temperature, $T_{max}$; that is, the fan drive may rotate at any speed necessary for cooling. The process thus proceeds to block 308 where the Boolean state variable TM (i.e. thermal management) is set equal to "OFF" and the desired fan speed, $\omega_{F,desired}$, is not modified. The process then exits FIG. 2 at block 310, and returns to FIG. 1 at block 108.

However, if the answer to the query in block 306 is "yes", i.e., the fan drive temperature, $T_F$, exceeds the threshold temperature, $T_{threshold}$, the fan drive is approaching the maximum temperature, $T_{max}$, and thermal management is necessary. In other words, the value for $\omega_{F,desired}$ determined in block 104 is not acceptable, since it will not properly cool the fan drive. The algorithm, under certain conditions as described herein, will thus attempt to determine a modified desired fan speed, $\omega_{F,desired,new}$, which will protect the fan drive. First, however, the controller preferably proceeds to block 312 to determine if engine coolant temperature, $T_{eng}$, is low enough to execute thermal management. The block uses the hysteretic pair, $T_1$, $T_2$. The engine coolant temperature should be low enough such that engine overheating due to fan speed reduction is not a concern. However, in some implementations, it may be desirable to never disallow thermal management of the fan drive; in that situation the hysteretic pair, $T_1$, $T_2$, can be set to values high enough so that thermal management always executes. Alternatively, block 312 need not be used with the present invention, such that a modified desired fan speed, $\omega_{F,desired,new}$, will always be determined if the block 306 is true.

The following is the algorithm for block 312:

```
If EngineTemp = OK then
    If T_eng ≥ T_2 then
        EngineTemp = NOT_OK
Else
    If T_eng < T_1 then
        EngineTemp = OK
```

Here, EngineTemp is a Boolean state variable that records the current state of engine coolant temperature (OK, NOT_OK). During vehicle and engine operation the controller, including the fan control function, tracks engine coolant temperature. EngineTemp is initialized to OK. As long as engine coolant temperature stays below $T_2$ then EngineTemp remains equal to OK and thermal management may be executed. The process thus proceeds to block 314. However, if engine coolant temperature equals or exceeds $T_2$, EngineTemp equals NOT_OK (the block is false) and desired fan speed reduction cannot occur. The process thus proceeds to block 308 where the Boolean state variable TM (i.e. thermal management) is set equal to "OFF" and the desired fan speed, $\omega_{F,desired}$, is not modified. The process then exits FIG. 2, block 310, and returns to FIG. 1 at block 108. EngineTemp remains equal to NOT_OK until the engine coolant temperature cools below $T_1$; at that point EngineTemp would reset to OK. The main purpose of the hysteresis pair (as opposed to one temperature to determine if EngineTemp is OK) is to "debounce" the algorithm and prevent going in and out of allowing desired fan speed modification due to noise on the engine coolant temperature sensor. If block 312 is true, that is, EngineTemp equals OK, the process proceeds to block 314, wherein the controller sets TM equal to "ON", since fan speed, $\omega_F$, can be modified to decrease the fan drive temperature, $T_F$, without compromising powertrain integrity. The process then proceeds to block 316.

In block 316, the controller determines $K_3$, which represents a minimum desired temperature decrease per time step. The controller preferably contains a list of values representing a piece-wise linear approximation of $K_3$ as a function of estimated fan drive temperature, $T_F$, determined using Equation 2 in block 304. $K_3$ is then preferably chosen by linear interpolation of the list of values. The process then proceeds to block 318 to calculate the new desired fan speed, $\omega_{F,desired,new}$, such that:

$$K_2(T_F(k)-T_\infty(k))-K_1\omega_{F,desired,new}^2(k)(\omega_{in}(k)-\omega_{F,desired,new}(k))\geq K_3, \quad \text{(Equation 3)}$$

using the value for $K_3$ determined in block 316. When the left hand side of Equation 3 (LHS3)=0, the desired slip power would equal the heat dissipated from the fins, and the fan drive would neither heat up nor cool down. If LHS3<0, the desired slip power is greater than the heat dissipated from the fins; thus the fan drive temperature, $T_F$, would increase. Conversely, if LHS3>0, the desired slip power is less than the heat dissipated from the fins; thus the fan drive temperature, $T_F$, would decrease. Therefore, to ensure the fan drive no longer increases in temperature, the controller determines the modified desired fan speed, $\omega_{F,desired,new}$, such that LHS3$\geq K_3$. Note that because of the nonlinear nature of Equation 3, this condition may be satisfied either by decreasing desired fan speed in some cases or by increasing desired fan speed in other cases. It is possible that the modified desired fan speed, $\omega_{F,desired,new}$, will not provide enough cooling to completely cool the engine. However, some engine cooling may be sacrificed in order to protect the fan drive, as long as block 312 is true. The process leaves FIG. 2 at block 310 and returns to FIG. 1 at block 108.

Block 108 asks whether the thermal management system is on to determine a ramping rate at which the fan speed, $\omega_F$, changes to the desired fan speed, $\omega_{F,desired}$, if TM equals "OFF", or to the modified desired fan speed, $\omega_{F,desired,new}$, if TM equals "ON". If TM equals "ON" (i.e. the answer to the query is "yes"), the process proceeds to block 110, which sets the ramping rate to $a_1$ rpm/sec when decreasing fan speed and $a_2$ rpm/sec when increasing fan speed. If TM equals "OFF" (i.e. the answer to the query is "no"), the process proceeds to block 112, which sets the ramping rate to $b_1$ rpm/sec when decreasing fan speed and $b_2$ rpm/sec when increasing fan speed. Typically the ramping rates $a_1$, $a_2$ in block 110 are faster than the ramping rates $b_1$, $b_2$ in block 112. By way of example, $a_2$ may be 300 rpm/sec, while $b_2$ may be 20 rpm/sec. A slower change tends to increase customer satisfaction by reducing noise perception due to fast ramping. However, when the fan drive temperature, $T_F$, needs adjustment through the thermal management algorithm, noise is of less concern.

The ramping rate $a_1$, $a_2$, $b_1$, $b_2$ is the output of block 110 or 112, and the input for block 114, a closed-loop fan speed control algorithm. Any of a number of closed loop control algorithms known to those skilled in the art can be implemented in this block. The output of this process is an actuator command (for example, current or voltage command), which is the input to block 116. Depending on which fan drive technology this algorithm is controlling (EV, MR fluid, other), block 116 takes the output of block 114 and uses appropriate hardware to impose a voltage, cause a current, etc., in the controllable fan drive in order to modify the fan speed, $\omega_F$, by the ramping rate $a_1$, $a_2$, $b_1$, $b_2$. The process concludes by returning to block 102 to repeat the algorithm. The process preferably repeats quite rapidly, for example, twenty times per second. Each time the process executes, the fan speed, $\omega_F$, will be modified by the ramping rate $a_1$, $a_2$, $b_1$, $b_2$ toward the desired fan speed, $\omega_{F,desired}$, if TM equals "OFF", or toward the modified desired fan speed, $\omega_{F,desired,new}$, if TM equals "ON". Eventually, the desired fan speed, $\omega_{F,desired}$, or the modified desired fan speed, $\omega_{F,desired,new}$, will be reached. However, at the same time, the inputs determined in block 102 may change, producing a new desired fan speed, $\omega_{F,desired}$, in block 104. The process preferably runs continually to ensure protection of the fan drive throughout vehicle operation.

The process of this invention has been described in the context of managing thermal energy in a MR fluid fan drive. It should be noted, however, that the process is applicable to any controllable viscous fluid fan drive. The difference between the control of fan speed from one fan drive design to another lies mainly in electronic control of some parameter of the viscous fluid. In the MR fluid fan drive, fan speed is typically controlled by varying a voltage applied to a coil for generating a magnetic field acting on the fluid. In an EV fan drive, fan speed is controlled by managing oil flow between a fluid storage chamber and a working chamber of the fan drive. Typically, the oil flow is controlled by a solenoid operated control valve. Thus, in the EV fan drive, changes in fan speed determined by the algorithm of this invention are executed by a signal to the solenoid. Additionally, by modifying the fan speed, $\omega_F$, the algorithm effectively manages all parameters which depend upon fan speed. Thus, while the primary objective of the present invention is to manage thermal energy, the algorithm may be used to manage other vehicle properties.

While the best mode for carrying out the invention has been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A method of controlling thermal energy within a fan drive having fan drive fins, said fan drive further having an input member rotating at an input speed, an output member attached to a fan and rotating at a fan speed, and a viscous fluid disposed therebetween, said fluid selectively transmitting torque between said input member and said output member such that said fan speed is a function of a controllable parameter of said fluid, said parameter being continually controlled by a programmed controller, said method comprising the steps of:
   pre-determining a threshold temperature for said fan drive, said threshold temperature approaching a maximum desirable temperature for said fan drive; and
   adjusting said fan speed as necessary to maintain a fan drive temperature below said threshold temperature, wherein said fan drive temperature is estimated based on a heat transfer characteristic of said fan drive fins.

2. The method of claim 1, wherein said controller regulates fluid volume to adjust said fan speed.

3. The method of claim 1, wherein said controller regulates fluid viscosity to adjust said fan speed.

4. The method of claim 1, wherein said adjusting step comprises:
   sensing vehicle parameters;
   estimating said fan drive temperature based on said vehicle parameters;
   comparing said fan drive temperature to said threshold temperature; and
   adjusting said fan speed at one of a first and a second rate when said fan drive temperature is less than said threshold temperature, and at one of a third and a fourth rate when said fan drive temperature exceeds said threshold temperature.

5. The method of claim 1, wherein said adjusting step comprises:
   sensing vehicle parameters;
   estimating said fan drive temperature based on said vehicle parameters;
   determining a desired fan speed based on said vehicle parameters;
   comparing said fan drive temperature to said threshold temperature;
   determining a modified desired fan speed if said fan drive temperature exceeds said threshold temperature; and
   adjusting said fan speed toward said desired fan speed when said fan drive temperature is less than said threshold temperature, and toward said modified desired fan speed when said fan drive temperature exceeds said threshold temperature.

6. A method of controlling fan speed in a cooling fan drive for a cooling system in an automotive vehicle, said fan drive having fan drive fins, said fan drive further having an input member rotating at an input speed and an output member attached to a fan and rotating at said fan speed, said input and output members separated by a working chamber filled with a viscous fluid, said fluid selectively transmitting torque between said input member and said output member such that said fan speed is a function of fluid viscosity within said working chamber, said fluid viscosity being controlled through application of a magnetic field thereto upon command of a programmed controller, said method comprising the steps of:
   pre-determining a threshold temperature for said fan drive, said threshold temperature approaching a maximum desirable fan drive temperature;
   sensing vehicle parameters;
   determining a desired fan speed based on said vehicle parameters;
   estimating a fan drive temperature based on a heat transfer characteristic of said fan drive fins;
   comparing said fan drive temperature to said threshold temperature;
   determining a modified desired fan speed when said fan drive temperature exceeds said threshold temperature, such that adjusting said fan speed to said modified desired fan speed maintains said fan drive temperature below said maximum desirable fan drive temperature; and
   adjusting said fan speed toward said desired fan speed when said fan drive temperature is less than said threshold temperature, and toward said modified desired fan speed when said fan drive temperature exceeds said threshold temperature, by varying said fluid viscosity within said working chamber, thereby reducing said fan drive temperature.

7. The method of claim 6, wherein said fan drive temperature is estimated using the following equation:

$$T_F(k+1) = T_F(k) + K_1 \omega_F^2(k)(\omega_{in}(k) - \omega_F(k)) - K_2(T_F(k) - T_\infty(k)),$$ wherein:

$T_F$ is said fan drive temperature;
$\Delta t$ is a sampling period;
k is the time step over said sampling period, $\Delta t$;

$$K_1 = \frac{K_F \Delta t}{m c_p},$$

with $K_F$ being a fan torque constant for a given fan design, m is effective mass, and $c_p$ is effective thermal heat capacity;
$\omega_F$ is said fan speed;
$\omega_{in}$ is said input speed;

$$K_2 = \frac{hA \Delta t}{m c_p},$$

with h being the effective convective heat transfer coefficient of said fan drive fins, and A being the area of said fan drive fins; and
$T_\infty$ is the ambient air temperature around said fan drive fins.

8. The method of claim 6, wherein said modified desired fan speed is determined such that: $K_2(T_F(k) - T_\infty(k)) - K_1 \omega_{F,desired,new}^2(k)(\omega_{in}(k) - \omega_{F,desired,new}(k)) \geq K_3$, wherein:

$$K_2 = \frac{hA \Delta t}{m c_p},$$

with h being the effective convective heat transfer coefficient of said fan drive fins, and A being the area of said fan drive fins;
$T_F$ is said fan drive temperature;
$\Delta t$ is a sampling period;
k is the time step over said sampling period, $\Delta t$;
$T_{28}$ is the ambient air temperature around said fan drive fins;

$$K_1 = \frac{K_F \Delta t}{m c_p},$$

with $K_F$ being a fan torque constant for a given fan design, m is effective mass, and $c_p$ is effective thermal heat capacity;
$\omega_{F,desired,new}$ is said modified desired fan speed;
$\omega_{in}$ is said input speed; and
$K_3$ is a minimum desired temperature adjustment per time step, k.

9. The method of claim 6, wherein said fan speed is adjusted by one of a first and a second ramping rate toward said desired fan speed, and by one of a third and a fourth ramping rate toward said modified desired fan speed.

10. The method of claim 6 further comprising:
   determining whether engine coolant temperature is low enough to permit an adjustment in fan speed without overheating a vehicle engine before adjusting said fan speed.

11. A method of controlling fan speed within a cooling fan drive for a cooling system in an automotive vehicle, said fan drive having fan drive fins, said fan drive further having an input member rotating at an input speed and an output member attached to a fan and rotating at said fan speed, said input and output members separated by a working chamber filled with a viscous fluid, said fluid selectively transmitting torque between said input member and said output member such that said fan speed is a function of fluid volume within said working chamber, said fluid volume being controlled by command of a programmed controller, said method comprising the steps of:
   pre-determining a threshold temperature for said fan drive, said threshold temperature approaching a maximum desirable fan drive temperature;

sensing vehicle parameters;
determining a desired fan speed based on said vehicle parameters;
estimating a fan drive temperature based on a heat transfer characteristic of said fan drive fins;
comparing said fan drive temperature to said threshold temperature;
determining a modified desired fan speed when said fan drive temperature exceeds said threshold temperature, such that adjusting said fan speed to said modified desired fan speed maintains said fan drive temperature below said maximum desirable fan drive temperature; and
adjusting said fan speed toward said desired fan speed when said fan drive temperature is less than said threshold temperature, and toward said modified desired fan speed when said fan drive temperature exceeds said threshold temperature, by varying said fluid volume within said working chamber, thereby reducing said fan drive temperature.

12. The method of claim 11, wherein said fan drive temperature is estimated using the following equation:

$$T_F(k+1) = T_F(k) + K_1 \omega_F^2(k)(\omega_{in}(k) - \omega_F(k)) - K_2(T_F(k) - T_\infty(k)), \text{ wherein:}$$

$T_F$ is said fan drive temperature;
$\Delta t$ is a sampling period;
$k$ is the time step over said sampling period, $\Delta t$;

$$K_1 = \frac{K_F \Delta t}{mc_p},$$

with $K_F$ being a fan torque constant for a given fan design, $m$ is effective mass, and $c_p$ is effective thermal heat capacity;
$\omega_F$ is said fan speed;
$\omega_{in}$ is said input speed;

$$K_2 = \frac{hA\Delta t}{mc_p},$$

with $h$ being the effective convective heat transfer coefficient of said fan drive fins, and $A$ being the area of said fan drive fins; and $T_\infty$ is the ambient air temperature around said fan drive fins.

13. The method of claim 11, wherein said modified desired fan speed is determined such that:

$$K_2(T_F(k) - T_\infty(k)) - K_1 \omega_{F,desired,new}^2(k)(\omega_{in}(k) - \omega_{F,desired,new}(k)) \geq K_3, \text{ wherein:}$$

$$K_2 = \frac{hA\Delta t}{mc_p},$$

with $h$ being the effective convective heat transfer coefficient of said fan drive fins, and $A$ being the area of said fan drive fins;
$T_F$ is said fan drive temperature;
$\Delta t$ is a sampling period;
$k$ is the time step over said sampling period, $\Delta t$;
$T_{28}$ is the ambient air temperature around said fan drive fins;

$$K_1 = \frac{K_F \Delta t}{mc_p},$$

with $K_F$ being a fan torque constant for a given fan design, $m$ is effective mass, and $c_p$ is effective thermal heat capacity;
$\omega_{F,desired,new}$ is said modified desired fan speed;
$\omega_{in}$ is said input speed; and
$K_3$ is a minimum desired temperature adjustment per time step, $k$.

14. The method of claim 11, wherein said fan speed is adjusted by one of a first and a second ramping rate toward said desired fan speed, and by one of a third and a fourth ramping rate toward said modified desired fan speed.

15. The method of claim 11, further comprising:
determining whether engine coolant temperature is low enough to permit a reduction in fan speed without overheating a vehicle engine before reducing said fan speed.

* * * * *